UNITED STATES PATENT OFFICE.

CARL AUER VON WELSBACH, OF VIENNA, AUSTRIA-HUNGARY, ASSIGNOR TO THE WELSBACH LIGHT COMPANY, OF NEW JERSEY.

INCANDESCENT LIGHTING SUBSTANCE.

SPECIFICATION forming part of Letters Patent No. 563,524, dated July 7, 1896.

Application filed September 23, 1895. Serial No. 563,433. (No specimens.) Patented in England January 8, 1893, No. 124; in Germany April 11, 1894, No. 74,745, and in Austria April 26, 1894, No. 57,050.

*To all whom it may concern:*

Be it known that I, CARL AUER VON WELSBACH, a subject of the Emperor of Austria-Hungary, residing at Vienna, in the Empire of Austria-Hungary, have invented a new and useful Incandescent Lighting Substance, (for which I have obtained Letters Patent in Austria, April 26, 1894, No. 57,050; in Great Britain, No. 124, dated January 8, 1893, upon a communication by my agent, Julius Moeller, and in Germany, April 11, 1894, No. 74,745,) of which the following is a specification.

My invention relates to improvements in the manufacture of the now well-known Welsbach incandescent light; and it consists in the production of the new incandescent substance possessing great ray power or vivid incandescence and durability, and in the composition used in the production of that substance.

I have discovered that if thorium oxid and uranium oxid are kept in a red-hot state for some time in a mixture and in that shape in which in the well-known Welsbach incandescent light other oxids are employed the before-named oxids combine to form a peculiar compound, which is distinguished by a great ray power or vivid incandescence and possessed of great durability. The before-named quality of thorium oxid appears all the more the purer it is, and the thus-formed thorium-uranium-oxid compound is of a yellow color. That a compound is formed by the above-described process or mixture is proved by observing the ray power or incandescence of the components themselves. Perfectly pure thorium oxid radiates but little light when heated to incandescence, and shines only in the flame-mantle with but little intensity. The emitted light is yellow. The uranium oxid glows when heated in the flame with a yellow reddish light of very little intensity. That, therefore, a compound of these two substances can become a useful incandescent substance would not appear from the properties of the individual components. The exciting power of the uranium oxid on the ray power or incandescence of the thorium oxid is so great that a trace so small as to be scarcely perceptible by known analytical methods will greatly increase the ray power or incandescence of thorium oxid. With increasing proportions of the uranium oxid the ray power increases rapidly, the light becoming more yellow, and it will in some cases reach at the proportion of about one per cent. of uranium oxid nearly its maximum.

The fact that pure thorium oxid radiates but little light when heated to incandescence was not known at the time of issuance of my former United States patents, nor was it known at that time that the addition of a comparatively small proportion of one of the other rare earths was sufficient to act as an excitant to produce the desired illuminating effect, these discoveries leading up to and forming the basis of my present invention.

The uranium oxid can be replaced in this composition, either in whole or part, by cerium oxid and other rare earths used either alone or together in suitable proportions of each or of such of them as may be preferred, the proportions of each whether used alone or together depending upon and varying according to the different oxid or oxids used, and their state of purity, but, in any event, in such suitably small proportions as shall be equivalent to the use of any one of them alone with the thorium oxid. Of such other rare earths I especially mention yttrium, ytterbium, terbium, erbium or its elements, lanthanum, neodymium, samarium, and praseodymium oxids.

The above-mentioned oxid compositions can be applied in the same manner to lighting purposes as has been done before with other oxid or oxid compositions when they were made into mantles or organs for producing incandescent light.

The practice in the manufacture of the well-known Welsbach incandescent light is carried on in this way. Nitrates of the respective oxids with or without the addition of ammonium nitrate are dissolved in water, and with this solution tubular tissues or webbings woven of single or several cords or a bundle of combustible organic fiber arranged in suitable form are saturated. These are then dried, furnished with a suspensory attachment and burned, so that the oxids remain as an exact duplicate of the original fabric and retain the shape of the tissues or cords. This can be done with the same method that has been pursued in producing the now well-known Welsbach light from the solution of other salts of oxids.

Instead of employing the desired oxids in the shape of nitrates one can also make use of solutions or emulsions of other salts or double salts with nitrate of ammonia, as, for example, acetates and hydroxids. The only condition to be observed is that such compounds in order to leave the oxids behind must necessarily be decomposed, and the acid or acids be expelled by heat, so as to leave the oxid remaining. In this condition nitrates may be used in union with the above to assist in burning out the organic matter.

In the foregoing description I have simply taken the uranium oxid as one of the best examples of those oxids possessing the requisite exciting power when brought in contact with the thorium oxid to give to it the very highest illuminating power, as my present invention applies alike to cerium oxid and the other rare earths possessing such exciting properties upon the thorium oxid, when brought in contact with it, of which I have already named several, being based, as it is, upon my discovery that the oxid of the metal thorium, when in a pure state, gives comparatively little light, but when there is added to it a very small percentage—very often not exceeding one per cent., though of course varying according to the particular oxid or oxids used and their purity—of the oxids of certain other of the rare metals, such, for example, as uranium, cerium, and others I have already mentioned, it has a very high illuminating power and those different oxids may be used separately or together in such suitably small proportions as shall be equivalent to the use of any one of them alone with the thorium oxid.

In the carrying out of my present invention, as a matter of preference, nitrate of thorium in its purest obtainable condition is dissolved in water with or without the addition of a small percentage of ammonium nitrate, to which is then added the proper small percentage—in most cases probably not exceeding two per cent.—of nitrate of one or more of such other metals as possess the requisite exciting property upon the thorium, preferably uranium, cerium, or those heretofore mentioned; and to the solution thus formed may be added, if desired, a small percentage of zirconium salt without destroying the character of my new substance, as it will also be understood that it will not be effected by the mere addition of such substances as are volatile at a high heat.

From the instruction herein given it will be evident to any one skilled in this art that my present invention is not—nor are the claims based thereupon, as I shall hereinafter state them to be—limited to the proportion specified, since of necessity they must vary within certain limits, depending upon which of the rare earths possessing the requisite exciting property upon the thorium are added to the thorium solution, and whether used separately or together and the conditions of their purity.

By the expression "cerium oxid or its equivalent," as employed in claim 4, I intend to include and cover thereby the replacing of such oxid by the oxids of uranium, ytterbium, yttrium, terbium, erbium, samarium, neodymium, praseodymium, or lanthanum, respectively, or other equivalent rare metal earths.

What I claim is—

1. A hood or frame for an incandescent gas-burner consisting of substantially pure thorium oxid with a small proportion of the oxid of any one or more of such of the rare metals as when added to the thorium oxid gives to it or excites it to a high illuminating power or vivid incandescence substantially as and for the purposes set forth.

2. A hood or frame for an incandescent gas-burner composed essentially of thorium oxid and a comparatively small percentage of the oxid of any one of the hereinbefore-mentioned rare metals, substantially as set forth.

3. A hood or frame for an incandescent gas-burner composed essentially of thorium oxid with a comparatively small percentage of the combined oxids of such of the hereinbefore-mentioned rare metals as may be selected and which possess in their combined or mixed condition the necessary properties that when added to the thorium oxid gives to it or excites it to a high illuminating power or vivid incandescence substantially as set forth.

4. A substance capable of resisting excessive heat and of radiating light in a glowing state, consisting of thorium oxid and a small proportion of cerium oxid or its equivalent as an excitant; substantially as described.

5. A filament fabric or textile frame of combustible material, impregnated with a solution, consisting essentially of a salt of thorium with a relatively small proportion of the salt or oxid of one or more of the hereinbefore-mentioned rare metals, substantially as set forth.

6. A filament fabric or textile substance of combustible material for manufacture into an incandescent substance, impregnated with a solution consisting essentially of a salt of thorium and a small percentage of the salt or oxid of one or more of such of the rare metals as when added to the thorium oxid gives to it or excites it to a high illuminating power or vivid incandescent, dissolved in water; substantially as set forth.

7. A filament fabric or textile frame or substance of combustible material for manufacture into an incandescent substance impregnated with a solution consisting essentially of salt of thorium and relatively small proportion of a salt or oxid of cerium, yttrium and zirconium, dissolved in water with or without the addition of ammonium nitrate, substantially as set forth.

8. A filament fabric or textile substance of combustible material for manufacture into an incandescent substance, impregnated with a solution consisting of a salt of thorium and a small percentage of the salt or oxid of one or more of such of the rare metals as when added to the thorium oxid gives to it or excites it to a high illuminating power or vivid incandescence, dissolved in water with the addition of ammonium nitrate; substantially as set forth.

9. A solution for impregnating filaments, fabrics or textile substances for incandescents, consisting essentially of a salt of thorium and a small percentage of the salt or oxid of one or more of such of the rare metals as when added to the thorium oxid gives to it or excites it to a high illuminating power or vivid incandescence; substantially as described.

In witness whereof I have signed my name to this specification, in the presence of two subscribing witnesses, this 5th day of September, 1895.

CARL AUER VON WELSBACH.

Witnesses:
ADOLF GALLIA,
JOHN R. BENNETT.